US008700295B2

(12) United States Patent
Wu et al.

(10) Patent No.: US 8,700,295 B2
(45) Date of Patent: Apr. 15, 2014

(54) METHOD AND APPARATUS FOR TRAFFIC INFORMATION CONVERSION USING TRAFFIC INFORMATION ELEMENT KNOWLEDGE BASE

(75) Inventors: Tao Wu, Beijing (CN); Weisong Hu, Beijing (CN); Xiaowei Liu, Beijing (CN); Weili Zhang, Beijing (CN); Chenghai Li, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 662 days.

(21) Appl. No.: 12/942,640

(22) Filed: Nov. 9, 2010

(65) Prior Publication Data

US 2011/0160986 A1 Jun. 30, 2011

(30) Foreign Application Priority Data

Dec. 28, 2009 (CN) .......................... 2009 1 0265618

(51) Int. Cl.
*G06F 19/00* (2011.01)
*G06G 7/70* (2006.01)

(52) U.S. Cl.
USPC .......................................................... 701/117

(58) Field of Classification Search
USPC .......................................................... 701/117
See application file for complete search history.

(56) References Cited

U.S. PATENT DOCUMENTS 5,694,122 A * 12/1997 Nakada ......................... 340/990
6,574,555 B2 * 6/2003 Mochizuki et al. ........... 701/532
7,302,342 B2 * 11/2007 Kobayashi et al. ........... 701/446
2006/0111833 A1 5/2006 Feldman et al.
2008/0071465 A1 * 3/2008 Chapman et al. ............. 701/117

FOREIGN PATENT DOCUMENTS

CN 101308487 A 11/2008
JP 2000-113389 A 4/2000
JP 2008-58112 A 3/2008
JP 2008-215860 A 9/2008
JP 2008-215861 A 9/2008
JP 2008-267937 A 11/2008
JP 2009-250942 A 10/2009

OTHER PUBLICATIONS

Machine Translation JP-2008-267937A, 2008.*
Machine Translation JP-2008-215861A, 2008.*
Machine Translation JP-2008-58112A, 2008.*
Machine Translation JP-2008-215860A, 2008.*

(Continued)

*Primary Examiner* — Mary Cheung
*Assistant Examiner* — Frederick Brushaber
(74) *Attorney, Agent, or Firm* — Sughrue Mion, PLLC

(57) ABSTRACT

A road network is described using roads, intersections and sections as traffic information elements and a correspondence between these elements and a road topological network in a digital map is established, so that a universal traffic information describing model, which is compatible with language used in people's daily life, can be established. The traffic information element knowledge base is generated based on roads, intersections and sections, respective attributes and the relationship between them, to support inter-conversion between road topological network traffic information and text-based traffic information. With the universal traffic information describing model and the traffic information element knowledge base, fusion and conversion of traffic data from various sources and to support various forms of presentation and interaction for traffic information, such as presentation of traffic information on digital navigation map, textual description of traffic information, map presentation of traffic information for urban trunk roads, etc. can be supported.

19 Claims, 9 Drawing Sheets

(56) References Cited

OTHER PUBLICATIONS

Office Action issued Jul. 18, 2012, by the Japanese Intellectual Property Office in counterpart Japanese Application No. 2012-247285.

H. Qi, et al., "A Map Ontology Driven Approach to Natural Language Traffic Information Processing and Services," ASWC 2006, 2006, pp. 696-710, LNCS 4185.

A. Asahara, et al., "Macroscopic Structural Summarization of Road Networks for Mobile Traffic Information Services", Proceedings of the 7th International Conference on Mobile Data Management, 2006, 9 pages.

* cited by examiner

Matched Traffic Information Elements

Output: Road X, A -to- C, Congested
Section 2, Congested
Section 4, Congested
Intersection B, West-to-East, Congested

METHOD AND APPARATUS FOR TRAFFIC INFORMATION CONVERSION USING TRAFFIC INFORMATION ELEMENT KNOWLEDGE BASE

FIELD OF THE INVENTION

The invention relates to the field of traffic information description, and more particularly, to establishment of a traffic information describing model, generation of a traffic information element knowledge base and mutual conversions of traffic information from various traffic data sources.

BACKGROUND OF THE INVENTION

In modern society, automobiles are becoming increasingly widespread with the rapid economic growth, which imposes more and more pressures on urban traffic and causes increasingly severe traffic jams. It is advantageous to mitigate traffic congestions, so as to reduce travel time for automobile drivers, reduce fuel consumption, improve economic efficiency of a city and facilitate environment protection. Thus, the traffic information service system plays an important role in urban intelligent traffic system.

With respect to traffic information gathering, the current rapid development of multi-media technology, mobile communication technology and the popularization of GPS technology provide great potentials for traffic information services. In traffic information gathering, stationary probing devices deployed along the roads, such as cameras, loops and RTMS (Remote Traffic Microwave Sensor), can accurately gather data for traffic information, which is, however, limited to arterial road network in general. The probe vehicle technology, which mainly uses taxies, can calculate traffic information for urban road network in real time, but it is subjected to objective constraints such as the number of probe vehicles. An information gathering personnel is capable of uploading observed traffic information as a text to a data center through a simple mobile communication device. In this case, however, information is limited in amount and also is inaccurate. A user uploading approach, in which a driver uploads traffic information for the area where he/she is currently located to a data center via a channel provided by a mobile information service provider, suffers from limited coverage. In summary, there has been a diversity of approaches for gathering traffic data. However, these approaches have different types of data formats, different description fashions and respective drawbacks in information completeness and accuracy. An effective approach for improving accuracy of traffic information and enlarging coverage is to represent traffic information data from different sources by a universal traffic information describing model, and thus to take advantages of different data sources and fuse traffic information from various data sources for supplementing each other. A traffic information describing model featured by text description can play a greater role in gathering and mining of traffic information data.

With respect to traffic information distribution, traditional distribution approaches are based on traffic information billboards and in-vehicle navigators. With the diversification of communication approaches and the development of information services, real-time traffic information becomes available at portal websites which then provide short message services and pictorial and/or textual prompts which will be ubiquitous in the future. A question-and-answer or interactive automatic traffic information service system is also desirable. Thus, a traffic information model supporting a number of types of presentation terminals, which supports both graphical display of navigation maps or man-made diagrams and understandable text information services, becomes increasingly important.

In all, a good and universal traffic information describing model should be compliant with traffic information description convention in people's daily life, capable of describing critical traffic information elements and establishing the relationship between the text description for these elements and geographical space. In a traffic information describing model, the text description of the traffic information elements and the correspondence between the elements and geographical space are very important for supporting fusion and conversion between text description-based traffic information and geographical space-based traffic information as well as information presentation on various terminals.

In practical applications, traffic data are generally based on digital navigation map data and text information. The digital navigation map data is primarily aimed at providing navigation road network and contains very detailed topological information on road network. Such topological information uses link and node as basic units. Herein, link is an arc in a road topological network, which is a segment of a road; while node is a vertex in a road topological network where neighboring links are connected. Stationary probing technologies, such as loops and cameras, and mobile probing technologies, such as probe vehicle, are mostly based on digital navigation map data, for which the calculated traffic information is described in units of link travel speed or travel time. However, such data structure is not designed for traffic information service and unable to define text description attributes for traffic information and to include the relationship between traffic information describing objects and links/nodes. On the other hand, traffic information in a text form is described in daily language and used for person-to-person communication. It has no relation established with links in the digital navigation map and cannot be used for driving navigation directly. As an example, a traffic information description of "Intersections with Road B and Road C on Road A are congested, with a speed of 10 km/h" is text description-based information, which is easily understandable for oral communication but cannot be used for navigation services directly. Additionally, there is no correspondence between intersections/road sections and links/nodes in the digital navigation map data. In contrast, the traffic information collected by the probe vehicle technology is based on link travel speed, which cannot be notified to the end user before being converted into text description-based traffic information description.

Some of the existing patent and non-patent documents relate to methods and models for describing traffic information. Most of these methods and models, however, only relate to how to map text description-based traffic information onto a road network such as digital navigation map, or only involve combination and fusion of traffic information which is based on a large amount of links each having a short length. They are only directed to solve some local or one-way conversion problems, but fail to establish an intermediate model between text description-based traffic information and link-based traffic information. Such intermediate model is essential for describing traffic information in our daily language. This model is a kernel, easily understandable model which can correspond to various forms of data sources for traffic information. Some related prior art patents and papers will be introduced in the following.

Patent Document 1 (CN 101308487A), "A Spatio-Temporal Fusion Method for Describing Dynamic Traffic Information in Natural Language", discloses a processing method for converting traffic information in natural language into traffic information based on a road topological network on an digital navigation map. At first, the traffic information in natural language is separated into location names, such as road names and bridge names, and their traffic conditions. These location names are then matched to geographical objects in the digital navigation map. In this case, a point, a path or nothing can be matched. Then a path among the matched results can be found, which is a geographical space traffic description corresponding to the traffic information in natural language.

Patent Document 2 (US20060111833A1), "Method and System for modeling and processing vehicle traffic data and information and applying thereof", discloses a method and system for modeling and processing traffic data and information. This document discloses the concept of directional road segment, i.e., a path segment between two intersections on a digital navigation map, which is used for fusing traffic data from various sources.

Non-Patent Document 1, "Macroscopic Structural Summarization of Road Networks for Mobile Traffic Information Services", published on the 7th International Conference on Mobile Data Management, 2006, proposes a method for simplifying road structures for mobile traffic information service. The complicated road topological network on the digital navigation map is combined, regulated and transformed into a simple, distorted, brief structural map.

Non-Patent Document 2, "A Map Ontology Driven Approach to Natural Language Traffic Information Processing and Services", published on the 1st Annual Asian Semantic Web Conference, 2006, proposes a geographical ontology model for traffic information processing and services. From the perspective of end users, this model defines geographical ontologies, for describing traffic information such as roads and sections, and the correspondence among the ontologies. This approach is mainly used for natural language processing in the field of traffic information.

Among the related solutions as mentioned above, the solution of Patent Document 1 is only capable of converting text description-based traffic information into geographical space-based traffic information, but not vice versa. Moreover, this solution is inaccurate, computationally consuming and based on necessary premises that information such as location names, bridge names, sections and intersections is included in the digital navigation map and that the operation of path matching can find a unique, correct path. As noted above, the digital navigation map is designed for path navigation, with its kernel being road topological network, but fails to fully consider roads, locations and the like involved in traffic information. Meanwhile, path matching usually result in a number of path options, from which it is difficult to determine which of the matched paths to be selected. Thus, this solution is only capable of converting text description-based information into geographical space-based traffic information with a low matching rate and high computational cost. The solution of Patent Document 2 only considers fusion but fails to consider how to provide text description-based, easily understandable traffic information for information distribution. Besides, it completely ignores intersection as a critical traffic information element. The solution of Non-Patent Document 1 can provide better user experience by graphically distributing traffic information, but cannot provide traffic information description in text. Additionally, Non-Patent Document 2 does not account for the correspondence between geographical ontology of traffic information and geographical space.

In all, the existing traffic information describing models have their respective drawbacks. They are incapable of establishing a traffic information describing model from a universal, reasonable and efficient perspective and globally considering the description of traffic information, including the traffic information elements to be defined, the relationship between these elements and the relationship between these elements and geographical space.

Thus, it is desired to establish a universal traffic information element describing model which is compliant with our daily usage of language and based on common traffic elements, such as roads, intersections, sections and the like. From the perspective of real applications, such a model can establish correspondence between these elements and the road topological network on digital navigation map, such that a two-way conversion between the traffic description information in text and the traffic information represented with the road topological network on digital navigation map is made possible. With this model, traffic information from various data sources can be integrated and various forms of traffic information can be distributed.

SUMMARY OF THE INVENTION

To solve the above problem, according to the present invention, a road network is described using roads, intersections and sections as traffic information elements and a correspondence between these elements and a road topological network in an digital map is established, such that a universal traffic information describing model, which is compliant with daily language features, can be established. Further, a traffic information element knowledge base can be generated based on the roads, intersections and sections, their respective attributes and the relationship between them, to support conversion from traffic information described with road topological network into traffic information described in text, and vice versa. With the universal traffic information describing model and the traffic information element knowledge base according to the present invention, it is possible to support fusion and conversion of traffic data from various sources and to support various forms of presentation and interaction for traffic information, such as presentation of traffic information on digital navigation map, textual description of traffic information, map presentation of traffic information for urban trunk roads, interaction for natural language queries of traffic information, etc.

According to an aspect of the present invention, a method for establishing a traffic information describing model is provided, which comprises:

an extraction step of extracting predefined traffic information elements and their attributes from a road topological network, based on basic constituent elements of the road topological network;

a relationship determining step of determining the relationship between the extracted traffic information elements, based on the extracted traffic information elements and their attributes and correspondence between the traffic information elements and the basic constituent elements of the road topological network; and a describing model establishment step of establishing the traffic information describing model corresponding to the road topological network with the extracted traffic information elements and their attributes and the determined relationship between the traffic information elements.

In an embodiment, the basic constituent elements of the road topological network comprise paths and nodes formed by intersection of the paths, and the predefined traffic information elements comprise roads, intersections and sections.

In an embodiment, the extraction step further comprises:

a road name acquisition step of acquiring all the road names in the road topological network by traversing all of the paths each having a road name in the road topological network and incorporating any duplicate names;

a single-direction road extraction step of detecting, for each of the acquired road names, from the road topological network a sequence of consecutive paths passing along each of the travel directions of the road having the road name, as a single-direction road extracted along the travel direction, and naming the extracted single-direction road and any of unnamed paths belonging to the extracted single-direction road with the road name, to obtain the name attributes of the single-direction road;

an intersection extraction step of sequentially detecting, for each of the acquired road names, nodes at which each path in the sequence of paths having the road name intersects with paths having different road names, and obtaining the geographical areas at which the nodes are located as intersections, to extract all intersections on a single-direction road having the road name, and naming the extracted intersections to obtain the name attributes of the intersections; and a section extraction step of acquiring, for each of the acquired road names, a road section between every two neighboring intersections as a section, based on all of the extracted intersections on the single-direction road having the road name, to extract all sections on the single-direction road having the road name, and naming the extracted sections to obtain the name attributes of the sections.

It is possible to use traffic objects compliant with language used in our daily life and based on real roads as the traffic information elements, so as to establish the correspondence between these traffic information elements and the basic constituent elements of the road topological network. Further, by establishing the traffic information describing model based on these traffic information elements, it is possible to facilitate natural language processing of the traffic information and traffic information interaction using language used in our daily life.

In an embodiment, in the intersection extraction step, two or more extracted intersections are combined together if they are located in the same geographical location.

In a typical road topological network on an digital navigation map, a road can be divided into a number of paths and any point at which the paths intersect with each other is defined as a node. As such, in reality, an intersection at which two roads intersect with each other generally corresponds to a plurality of nodes. In the present invention, such nodes can be incorporated together by deciding whether their associated intersections have the same geographical areas or names, thereby extracting the intersection on the real roads accurately.

In an embodiment, in the relationship determining step, the relationship between the traffic information elements is determined by determining an entrance road, an exit road and a turn direction for each of turns at each intersection, determining a start intersection and an end intersection for each section, and determining all intersections and sections included in each single-direction road.

In this way, the respective geographical spaces for intersections, sections and single-direction roads can be described. Particularly, the respective turning directions for an intersection can be described via its entrance road, exit road and turn direction, which is advantageous in real applications.

In an embodiment, in the describing model establishment step, the traffic information describing model corresponding to the road topological network is established with the extracted single-direction roads, sections and intersections and their respective name attributes, the determined relationship and the correspondence between, on one hand, the extracted single-direction roads, sections and intersections and, on the other hand, the paths and nodes.

In this way, the road topological network based on links and nodes can be converted into a road network model based on single-direction road, sections and intersections for describing traffic information in a manner more compliant with language in our daily life.

Herein, the above method further comprises: a traffic information element name editing step of editing, if the obtained name of any traffic information element is incorrect or incompliant with the name used in our daily life, the name of the traffic information element to obtain the name attribute which is correct and compliant with the name used in our daily life.

In this way, when the automatically generated name is incorrect or incompliant with the name used in our daily life, it is possible to manually edit the name and update the traffic information describing model.

In an embodiment, the method further comprises a knowledge base generation step of generating a traffic information element knowledge base by using the established traffic information describing model.

In this way, it is possible to establish, for each of a number of types of road topological networks, a corresponding traffic information describing model and to generate a universal knowledge base based on the established models, so as to support the fusion of traffic data from different sources and/or based on different traffic maps.

In an embodiment, a method for converting between road topological network-based traffic information and text description-based traffic information, when converting road topological network-based traffic information into text description-based traffic information, the method comprises:

a traffic information element matching step of retrieving, in a traffic information element knowledge base, names matched with names of respective paths in the road topological network-based traffic information, and obtaining traffic information elements corresponding to the matched names; and a fusion step of fusing the traffic information of the respective paths based on correspondence between the obtained traffic information elements and the respective paths, to generate text description-based traffic information for the obtained traffic information elements;

when converting text description-based traffic information into road topological network-based traffic information, the method comprises:

a traffic information element matching step of retrieving, in a traffic information element knowledge base, names matched with names of roads and/or intersections in the text description-based traffic information, and obtaining traffic information elements corresponding to the matched names; and a path determining step of determining paths corresponding to the obtained traffic information elements; and a road topological network-based traffic information generating step of obtaining traffic information for the determined paths and generating the road topological network-based traffic information for the determined paths;

wherein the traffic information element knowledge base is generated by using a traffic information describing model established by the above method for establishing a traffic information describing model.

In this way, it is possible to convert automatically, based on the digital navigation map, the traffic information, probed by probe vehicles for example, such as link travel speed and link travel time, into corresponding traffic information elements, such as text description-based traffic information for a particular road or intersection, so as to facilitate the distribution and interaction of the traffic information. Also, the text description-based traffic information reported from, for example, a traffic monitoring personnel can be directly converted into the road topological network traffic information corresponding to the digital navigation map, such that the traffic information can be supplemented and updated timely and conveniently.

In further embodiments, an apparatus for establishing a traffic information describing model, and an apparatus for converting between road topological network-based traffic information and text description-based traffic information are also provided.

The present invention provides many advantages including, but not limited to, the followings. It is possible to fully consider traffic information features described in our daily language, so as to provide a traffic information describing model with roads, intersections and sections being its kernel elements, and to establish a correspondence between these elements and a road topological network on an digital navigation map. The traffic information describing model as provided herein contains roads, intersections, sections and the relationship therebetween. The road nodes, road sections and various travel directions thereof can be described in detail in both text and road topological network, such that the traffic information can be described accurately and specifically. The traffic information describing model provided herein is applicable to different types of data sources for traffic information, and can fuse the traffic data from different sources to obtain a fusion result applicable to navigation systems as well as various forms of distribution and interaction for traffic information. Also, the traffic information describing model provided herein is based on traffic information element as its kernel and provides ontological objects for natural language processing of traffic information. The present invention can derive a traffic information describing model in advance, based on an digital navigation map, thereby being highly efficient in that the model can be calculated just once but reused several times. The present invention supports various specifications of digital navigation maps and is thus widely applicable. The concept of intersection containing geographical space information and turn direction, as provided herein, can effectively increase accuracy of map matching of the probe vehicle technology. Additionally, the model and its correspondence with the road topological network according to the present invention can be automatically generated by computer programs, thereby significantly improving production efficiency.

BRIEF DESCRIPTION OF THE DRAWINGS

The above and further objects, features and advantages of the present invention will be more apparent from the following description of the preferred embodiments with reference to the figures, in which.

DETAILED DESCRIPTION OF PREFERRED EMBODIMENTS

Figure 1:
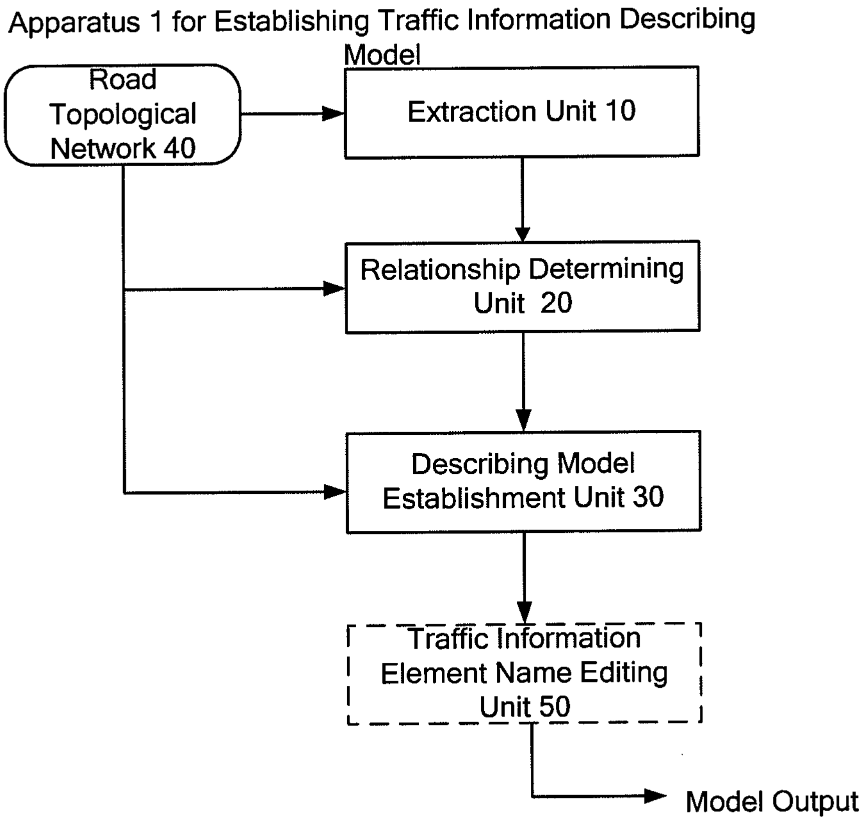
FIG. 1 is a schematic block diagram showing the structure of the apparatus for establishing a traffic information describing model according to the present invention.

The basic constituent elements of a road topological network on a widely-used digital navigation map are paths and nodes formed by intersection of the paths. A road, such as a trunk road or a side road, can be divided into a number of paths based on roadways or particular lengths. Any point at which the paths intersect with each other is defined as a node. As such, in the real world, a road generally corresponds to a plurality of paths in the road topological network, and an intersection at which two roads intersect with each other generally corresponds to a plurality of nodes. Furthermore, the attributes of a path are defined by a start node and an end node, and the attributes of a node are defined by neighboring paths. Only some of the paths each have the name of the road to which it belongs. Hence, in a real application, traffic information based on the road topological network cannot answer a question like “How is the traffic condition of Road X”, since “Road X” cannot be determined in the road topological network. Such traffic information is only capable of informing a navigation system whether a particular path is suitable for traveling, which paths are available for traveling further, as well as a travel speed, travel time and/or congestion level for a particular path as calculated by the probe vehicle technology or the like. It cannot provide an answer about traffic condition of a particular road/intersection in a manner compliant with language in our daily life. On the other hand, for a traffic information description of "Intersections with Road B and Road C on Road A are congested, with a speed of 10 km/h" is text description-based information, it is easily understandable for oral communication but cannot be used for navigation services directly, since there are no information elements such as intersections and sections in the digital navigation map data, and thus there is no correspondence between intersections/sections and paths/nodes on the digital map.

In view of the above problems, from the perspective of real applications, the inventors of the present invention propose to establish, based on basic constituent elements of the road topological network, a universal traffic information element describing model which is compliant with daily language and based on such primary elements such as roads, intersections, sections. In this way, correspondence between these elements and the road topological network on digital navigation map can be established, so that a two-way conversion between the traffic description information in text and the traffic information represented with the road topological network on digital navigation map is made possible. With this model, traffic information from various data sources can be integrated, and various forms of traffic information can be distributed.

The present invention can be applied to various road maps, including GPS digital navigation map, urban road digital map and the like. The road topological networks of these road maps differ from each other in terms of basic constituent elements. The basic constituent elements of a GPS digital navigation map, for example, are links and nodes, while the basic constituent elements of an urban road digital map may be trunk paths, side paths, ring paths, intersections, etc. Herein, for purpose of clarity, the basic constituent elements for the road topological networks of various road maps are collectively referred to as paths and nodes formed by intersection of the paths.

Moreover, the traffic information elements according to the present invention are determined based on real geographical objects, taking daily language usage and actual applications into account. In our daily life, people usually say "Vehicles travel slowly on Road X" or "Intersection X is congested". Thus, the traffic information elements used herein are roads, intersections and sections between neighboring intersections, in order to comply with the actual geographical space of the roads and language usage in our daily life. However, the present invention is not limited to this; rather, other traffic information elements can be defined depending on applications and requirements.

In the following, the detailed description of the exemplary embodiments according to the present invention will be given with reference to the figures.

FIG. 1 is a schematic block diagram showing the structure of the apparatus for establishing a traffic information describing model according to the present invention. As shown, the apparatus 1 for establishing a traffic information describing model comprises: an extraction unit 10 for extracting predefined traffic information elements and their attributes from a road topological network, based on basic constituent elements of the road topological network; a relationship determining unit 20 for determining the relationship between the traffic information elements, based on the extracted traffic information elements and their attributes and correspondence between the traffic information elements and the basic constituent elements of the road topological network; and a describing model establishment unit 30 for establishing the traffic information describing model corresponding to the road topological network with the extracted traffic information elements and their attributes and the determined relationship between the traffic information elements. Specifically, the apparatus 1 for establishing a traffic information describing model extracts roads, intersections and sections as well as their attributes by the extraction unit 10, based on paths and nodes in the road topological network 40 on an digital navigation map. Herein, the attributes may include a name and a direction of a road, a name and a type of an intersection, and a name and a direction of a section. Then, the relationships among the roads, intersections and sections can be determined by the relationship determining unit 20. The relationships may refer to, for example, which sections are contained in which road, what turn directions for an intersection and which road along each turn direction are, which sections are the start intersection and end intersection of some section, and the like. Finally, the model corresponding to the road topological network can be established by the describing model establishment unit 30 for describing traffic information, based on the extracted roads, intersections and sections, their attributes and the determined relationship between them.

Further, the apparatus 1 for establishing a traffic information describing model can comprise a traffic information element name editing unit 50 for editing, if the obtained name of any traffic information element is incorrect or incompliant with a name used in people's daily life, the name of the traffic information element to obtain the name attribute which is correct and compliant with the commonly-used name. The unit 50 is illustrated in FIG. 1 in dashed line to indicate that it is optional.

The respective units of the apparatus 1 for establishing a traffic information describing model will be further detailed with reference to FIGS. 2-8.

Figure 2:
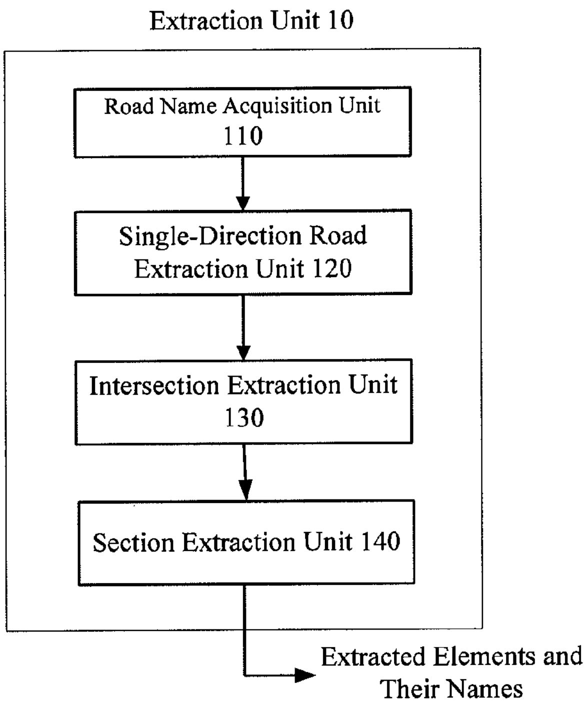
FIG. 2 is a schematic block diagram showing the structure of the extraction unit as shown in FIG. 1.

FIG. 2 is a schematic block diagram showing the structure of the extraction unit 10 as shown in FIG. 1. The extraction unit 10 comprises a road name acquisition unit 110, a single-direction road extraction unit 120, an intersection extraction unit 130 and a section extraction unit 140.

The road name acquisition unit 110 is configured to acquire all the road names on the road topological network 40 by traversing all of the paths each having a road name in the road topological network and integrating any repeated names. Often, the data of the road topological network 40 contain a path data table and a node data table, in which a path is an arc of the network topological network and a node is a vertex connecting two or more arcs. The key attribute of a path object is information on its start and end nodes. Some of the paths have the names of the real roads to which they belong. Such names are generally names used in people's daily life. In order to find all road names in the entire road topological network 40, it is necessary to traverse the road names of all paths and combine duplicate road names to obtain a set of road names. The extraction unit 10 may further comprise a road name storage unit (not shown) for storing the obtained road name set.

Figure 4:
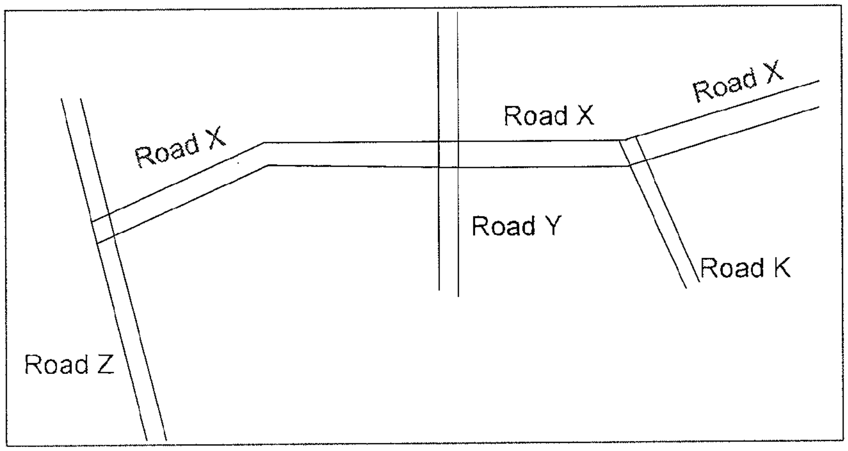
FIGS. 4-6 illustrate the extraction results of roads, intersections and sections, respectively.
Figure 8:
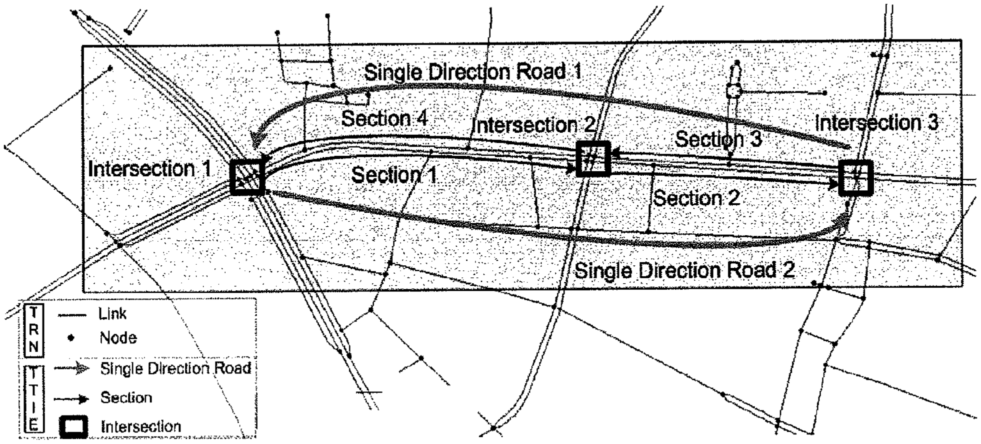
FIG. 8 is a schematic diagram showing the correspondence between the established traffic information describing model and the road topological network.

Following acquisition of all the road names, the single-direction road extraction unit 120 detects, for each of the acquired road names, from the road topological network 40 a sequence of consecutive paths passing along each of the travel directions of the road having the road name, as a single-direction road extracted along the travel direction, and to name the extracted single-direction road and any of unnamed paths belonging to the extracted single-direction road with the road name, so as to obtain the name attributes of the single-direction road. In people's daily life, one road name generally corresponds to a plurality of path sequences in the road topological network 40 and to trunk paths and side paths along a number of travel directions in geographical space. Herein, a correspondence between a single-direction road and a sequence of consecutive paths is to be established. As such, any bidirectional road will be divided into two single-direction roads in the two different directions. The single-direction road along a particular travel direction is obtained by detecting along the direction a sequence of consecutive paths corresponding to the road name. In addition, the obtained single-direction road is named with the road name. Alternatively, the obtained single-direction road can be named in any other suitable manner, for example, with the road name plus a travel direction. As an example, Xue Yuan Road is a bidirectional road along two travel directions, one being from south to north and the other one being from north to south. Thus, Xue Yuan Road can be divided into two single-direction roads named as “Xue Yuan Road” collectively, or “Xue Yuan Road south-to-north” and “Xue Yuan Road north-to-south”, respectively. Meanwhile, as some of the paths are unnamed, the names of these paths can be supplemented based on the path connectivity relationship and the road names in the road topological network 40. For example, if both the precede and succeed paths of the current path have the same road name, the current path can also be named with the same road name. In this way, a correspondence between a single-direction road and a sequence of consecutive paths can be established. It is possible to know which single-direction roads correspond to which road name, and which sequences of consecutive paths correspond to which single-direction road. Referring to FIGS. 4 and 8, FIG. 4 shows a schematic diagram of the operation result of the single-direction extraction unit 120, and FIG. 8 shows a schematic diagram of the correspondence between the established traffic information describing model and the road topological network, in which figures the thin black lines and the black spots indicate the paths and nodes in the road topological network, respectively. For clear illustration of the extracted single-direction roads, the road topology shown in FIG. 4 is a simplified diagram of the road topological network in FIG. 8, and illustrates several single-direction roads including Road X, Road Y, Road Z and Road K.

The extraction unit 10 can further comprise a single-direction road name and passing path storage unit (not shown) for storing the extracted single-direction roads and the sequence of consecutive passing paths thereof.

Figure 5:
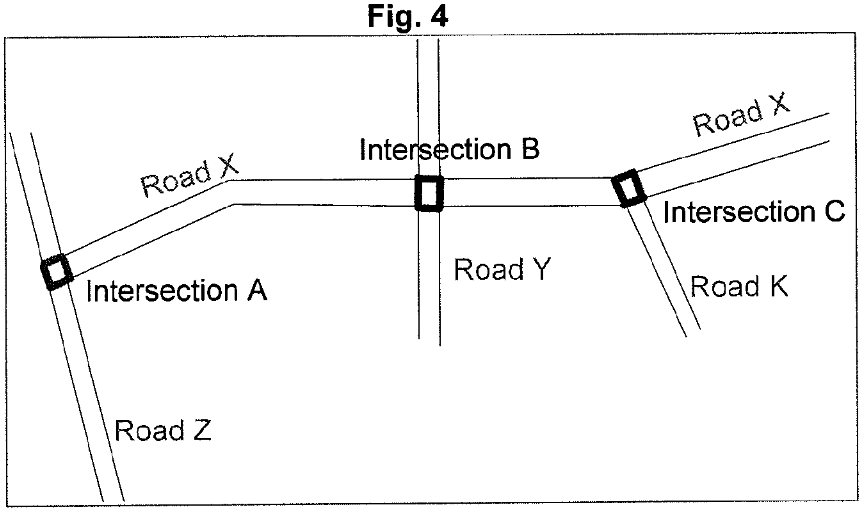
Figure 7:
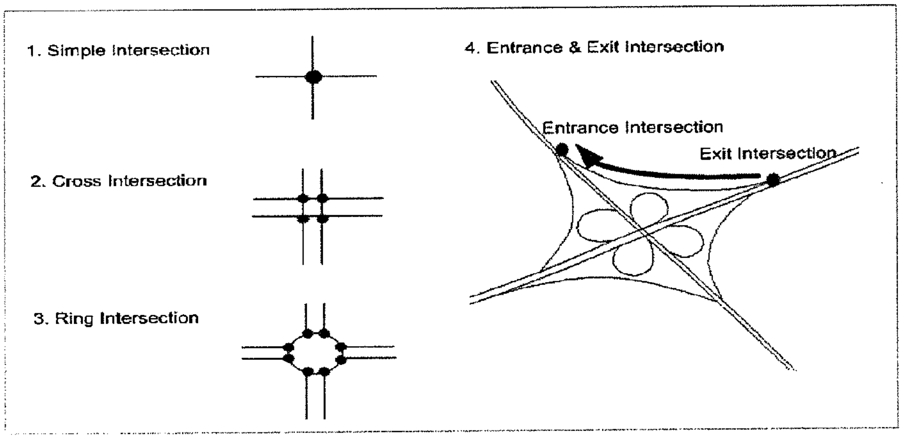
FIG. 7 is a schematic diagram showing various types of intersections.
Figure 9:
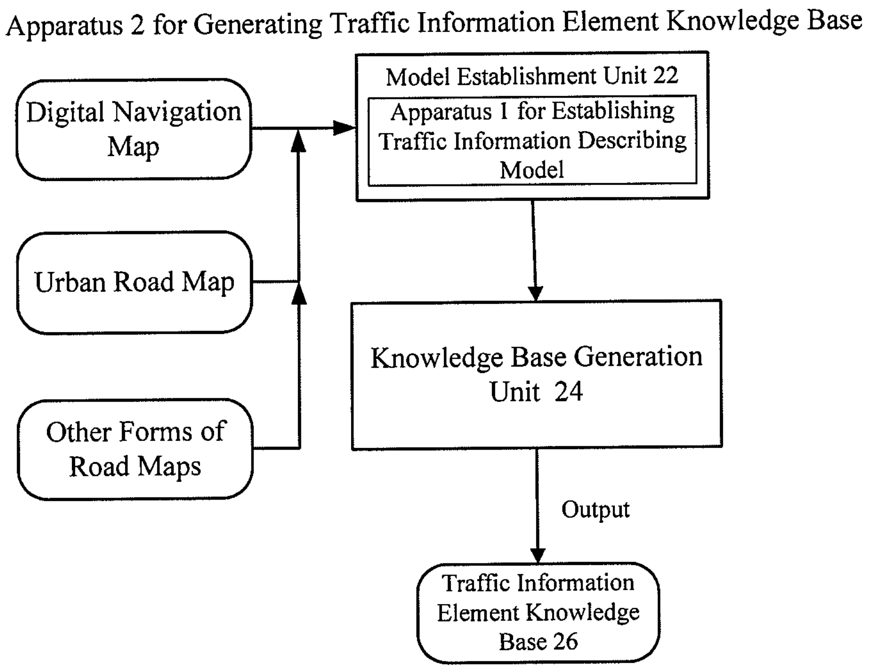
FIG. 9 is a schematic block diagram showing the structure of the apparatus for generating a traffic information element knowledge base according to the present invention.

The intersection extraction unit 130 is configured to sequentially detect, for each of the acquired road names, nodes at which each path in the sequence of paths having the road name intersects with paths having different road names, and to obtain the geographical areas at which the nodes are located as intersections, so as to extract all intersections on a single-direction road having the road name, and is configured to name the extracted intersections to obtain the name attributes of the intersections. With the above name supplement process for paths, every path can have its corresponding road name. Thus, a position at which paths having different names intersect with each other will corresponds to an intersection at which real roads intersect with each other. By sequentially detecting along a single-direction road the nodes at which each path intersects with paths having other road names, it is possible to find the intersections at which the single-direction road intersects with other single-direction roads having different road names. In addition, an intersection can be automatically named according to a predefined rule, e.g., according to levels of roads. That is, an intersection can be named in a form of “a name of higher-level road and a name of lower-level road”. As an example, the intersection at which Xue Yuan Road intersects with the 4th North Ring can be named as “intersection between the 4th North Ring and Xue Yuan Road”, since the former has a higher level than the latter. The names of the respective intersections can be obtained automatically and uniformly in accordance with a predefined rule. According to the present invention, the geographical area where the node formed by intersection of paths is located is defined as an intersection, taking into account the fact that, in a road topological network on an digital navigation map, a road is generally divided into a number of paths and any point at which the paths intersect with each other is defined as a node. As such, a real intersection at which two roads intersect with each other generally corresponds to a plurality of nodes, as shown in FIG. 9. Hence, if each of all the nodes is taken as an intersection, the real road conditions cannot be reflected correctly. Therefore, the intersection extraction unit 130 is configured to combine two or more extracted intersections together if they are located in the same geographical location. Further, if two or more intersections automatically obtained based on a predefined rule have the same name, it is indicated that they correspond to the same intersection in geographical space, and thus can be combined together by the intersection extraction unit 130. FIG. 5 shows a schematic diagram of the operation result of the intersection extraction unit 130. It can be seen from comparison with FIG. 8 that the road topology shown in FIG. 5 is a simplified version of the road topological network in FIG. 8. The intersections A, B and C in FIG. 5 corresponds to the intersections 1, 2 and 3 as shown in FIG. 8, respectively. As shown, each of the intersections A, B and C corresponds to a plurality of nodes. There are various types of intersections, such as, cross intersections, T intersections, ring intersections, trunk road exits, trunk road entrances, road terminals, and the like, as illustrated in FIG. 7.

The extraction unit 10 can further comprise an intersection name and passing path storage unit (not shown) for storing the extracted intersection names and the respective paths passing the intersection.

Figure 6:
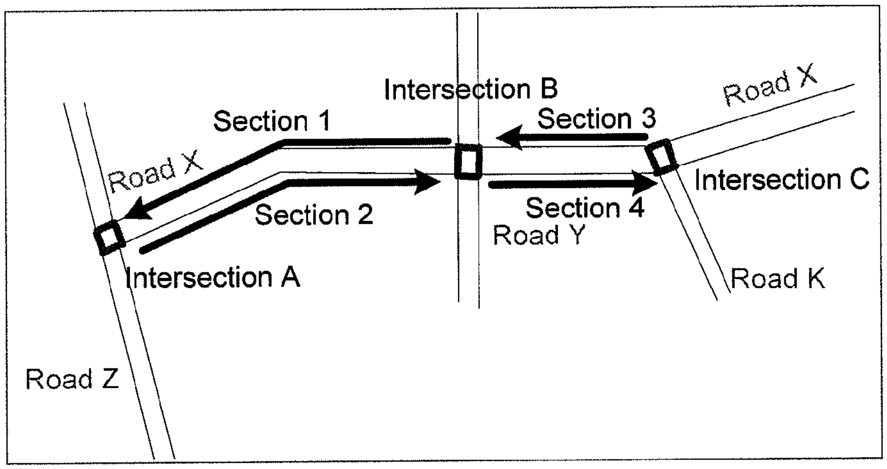

After extraction of the intersections, the section extraction unit 140 acquires, for each of the acquired road names, a road section between neighboring intersections as a section, based on all of the extracted intersections on the single-direction road having the road name, so as to extract all sections on the single-direction road having the road name, and to name the extracted sections to obtain the name attributes of the sections. Herein, the sections can be named according to a predefined rule. For example, a section can be named with intersections, e.g., as “a section from intersection XX to intersection XXX”. Also, a section may have a direction attribute which is generally identical to the direction of the single-direction road to which the section belongs. FIG. 6 shows a schematic diagram of the operation result of the section extraction unit 140. Again, it can be seen from comparison with FIG. 8 that the road topology in FIG. 6 is a simplified schematic diagram of the road topological network in FIG. 8. FIG. 6 shows Sections 1, 2, 3, and 4.

The extraction unit 10 can further comprise a section name and passing path storage unit (not shown) for storing the extracted section names and the sequence of consecutive passing paths thereof.

Figure 3:
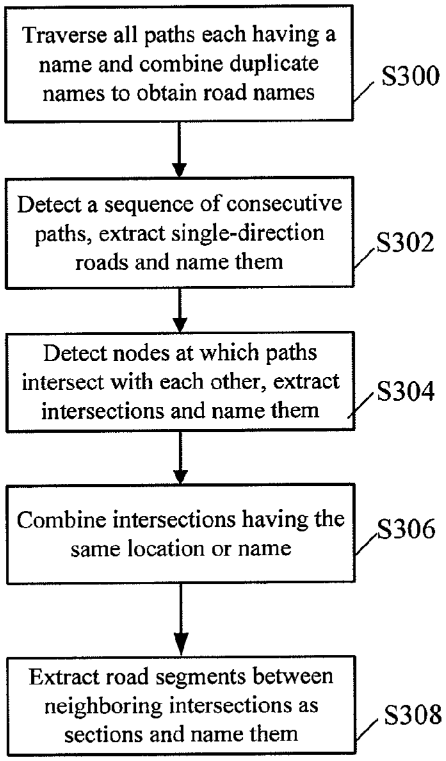
FIG. 3 is a schematic flowchart illustrating a process in which the extraction unit extracts the traffic information elements from the road topological network.

FIG. 3 is a flowchart illustrating a process in which the extraction unit 10 extracts the traffic information elements from the road topological network 40. At step 300, the road name acquisition unit 110 acquires all the road names on the road topological network by traversing all of the paths each having a road name in the road topological network and incorporating any duplicate names together. At step 302, the single-direction road extraction unit 120 detects, for each of the acquired road names, from the road topological network a sequence of consecutive paths passing along each of the travel directions of the road having the road name, as a single-direction road extracted along the travel direction, and names the extracted single-direction road and any of unnamed paths belonging to the extracted single-direction road with the road name, to obtain the name attributes of the single-direction road. At step 304, the intersection extraction unit 130 sequentially detects, for each of the acquired road names, nodes at which each path in the sequence of paths having the road name intersects with paths having different road names, and obtains the geographical areas at which the nodes are located as intersections, to extract all intersections on a single-direction road having the road name, and names the extracted intersections to obtain the name attributes of the intersections. At step 306, the intersection extraction unit 130 combines two or more intersections which are repetitively extracted. At step 308, the section extraction unit 140 acquires, for each of the acquired road names, a road section between neighboring intersections as a section, based on all of the extracted intersections on the single-direction road having the road name, to extract all sections on the single-direction road having the road name, and names the extracted sections to obtain the name attributes of the sections.

After the extraction unit 10 extracts the traffic information elements such as single-direction roads, intersections and sections, the relationship between these traffic information elements is required to be determined. The relationship determining unit 20 is configured to determine the relationship between the traffic information elements by determining an entrance road, an exit road and a turn direction for each of turns at each intersection, determining a start intersection and an end intersection for each section, and determining all intersections and sections included in each single-direction road.

In real applications, an intersection is a geographical space and a hub of a road network, at which traffic flows from various directions are merged. Thus, the intersection is prone to be congested and the traffic condition thereof is very important. Further, a traffic information description of "intersection X is congested" is commonly used in people's daily life. According to the present invention, an intersection is used as a traffic information element, so as to highlight the importance of intersection as a hub in a road network. Also, individual paths passing an intersection are extracted in a refined manner to determine the detailed description of turn relationship for the intersection, thereby facilitating more accurate processing of traffic data. A normal cross intersection has 12 turn directions (including directions of proceeding straight-forward), including north-to-south, south-to-north, east-to-west, west-to-east, north-to-east, east-to-north, north-to-west, west-to-north, south-to-east, east-to-south, south-to-west and west-to-south. For clarifying the turn relationship of the intersection and thus determining the relationship between the intersection and each of its associated roads, the turn directions of the intersection can be described with its entrance road, exit road and turn direction, according to the present invention. For example, the turn relationship for "the intersection from the 4th North Ring to Xue Yuan Road" may include "entrance road: 4th North Ring; exit road: Xue Yuan Road; turn direction: east-to-north", "entrance road: Xue Yuan Road; exit road: 4th North Ring; turn direction: south-to-east", or the like. As such, the relationship between the intersection and each of its associated roads can be determined.

Furthermore, a start intersection and an end intersection can be determined for each section to determine the relationship between the section and the intersections. Meanwhile, it is possible to determine, for each single-direction road, sections and intersections included in the single-direction road, so as to determine the relationship among the roads, sections and intersections.

In the above description, the operation of the relationship determining unit 20 is performed after the extraction of the traffic information elements by the extraction unit 10. Alternatively, according to the present invention, the operations of the relationship determining unit 20 and the extraction unit 10 can be incorporated so that, during extraction of the traffic information elements, the relationship between the traffic information elements can be determined and the relationships among the road, intersections and sections can be stored in the single-direction road name and passing path storage unit, the intersection name and passing path storage unit and the section name and passing path storage unit, respectively.

So far, the describing model establishment unit 30 can establish the model corresponding to the road topological network using the extracted roads, intersections and sections as well as their attributes and the relationship between them as objects, so as to describe the traffic information. Referring to FIG. 8, which is a schematic diagram showing the correspondence between the established traffic information describing model and the road topological network. There are two single-direction roads, SingleDirectionRoad1 and SingleDirectionRoad2. Along the SingleDirectionRoad1, there are sequentially three intersections, Intersection3, Intersection2 and Intersection1, and two sections, Section3 and Section4. Along the SingleDirectionRoad2, there are sequentially three intersections, Intersection1, Intersection2 and Intersection3, and two sections, Section1 and Section2. Each intersection is formed by crossings between a road and other N roads (N>=1). For storage or recording of the established model, the extracted roads, intersections and sections as well as their attributes and the relationship between them can be integrated into an appropriate data structure to form respective descriptions for the roads, intersections and sections, thereby establishing a model corresponding to the road topological network. As an example, the single-direction road, SDR, the section, Sc, and the intersection, In, can be described in the following manner:

SDR=(SDRName, SDRDirection, SDRSc, SDRIn, SDRLink, SDRNode);

Sc=(ScName, ScDirection, Istart, lend, ScLink, ScNode); and

In =(InName, TR, InLink, InNode, InType; TR=(IName, OName, TurnDirection));

where SDRName, SDRDirection, SDRSc, SDRIn, SDRLink and SDRNode denote the name, direction, sections included, intersections included, passed paths and passed nodes of the single-direction road, respectively; ScName, ScDirection, Istart, lend, ScLink and ScNode denote the name, direction, start intersection, end intersection, passed paths and passed nodes of a section, respectively; InName, TR, InLink, InNode and InType denote the name, turn direction, passed paths, passed nodes and type of the intersection, respectively; and IName, OName and TurnDirection denote the entrance road name, exit road name and turn direction in the turn relationship for the section, respectively.

In this way, the traffic information describing model, RNDM, corresponding to the road topological network can be established as follows:

RNDM=(Link, Node, SDR, In, Sc).

Also, the RNDM may include the specific locations of the paths and nodes in the road topological network, their sequence descriptions and respective attributes, all of which can be obtained from various existing maps such as the digital navigation map.

Further, the apparatus 1 for establishing a traffic information describing model may comprise a traffic information element name editing unit 50 for editing the names of the traffic information elements so that the names can be more compliant with those used in people's daily life. Herein, when naming a traffic information element according to a predefined rule, the resulting name may be incompliant with the name used in people's daily life. For example, the intersection between the 4th North Ring and Xue Yuan Road may be named as "the intersection between the 4th North Ring and Xue Yuan Road" according to a predefined rule, while this intersection is actually referred to as "Xue Yuan Bridge" in people's daily life. If the automatically generated name is not modified, a location corresponding to the traffic information of "Xue Yuan Bridge" cannot be found in the road topological network, or even an error may occur, as there is no element having such a name among the traffic information elements. In view of this, the traffic information element name editing unit 50 is provided for editing, if the name of any traffic information element generated according to the predefined rule is incorrect or incompliant with the commonly-used name, the name of the traffic information element to obtain the name attribute which is correct and compliant with the commonly-used name.

In addition, when a road name is changed, the established traffic information describing model can be updated accordingly by the traffic information element name editing unit 50.

The exemplary embodiments of the present invention have been described above in which the traffic information describing model is established based on roads, sections and intersections as traffic information elements. In this way, the correspondence between the model and the road topological network in digital map can be established, thereby establishing a universal traffic information describing model compatible with the language usage in people's daily life. In the following, applying the traffic information describing model to generate a traffic information element knowledge base will be explained in detail.

FIG. 9 is a schematic block diagram showing the structure of the apparatus 2 for generating a traffic information element knowledge base according to the present invention. The apparatus 2 comprises a model establishment unit 22 for establishing, for one or more types of road topological networks, a traffic information describing model corresponding to each of the one or more types of road topological networks by using the apparatus 1 for establishing a traffic information describing model; and a knowledge base generation unit 24 for generating a traffic information element knowledge base 26 based on the established traffic information describing model.

As noted above, there are various types of road maps in the real world, including urban/city maps, navigation maps, simplified maps, text description-based maps, etc. These maps are different from each other in terms of basic constituent elements. Thus, the traffic information based on different maps cannot be mutual converted and compatible with each other. In order to unify these maps to support fusion of traffic data from different information sources and/or based on different traffic maps, a traffic information element knowledge base is generated according to the present invention. The knowledge base can include traffic information describing models corresponding to the respective road topological network for one or more types of maps. Thus, it can be used as a universal knowledge base to support fusion and conversion of the traffic data from different information sources and/or based on different traffic maps.

Next, the mutual conversion between traffic information from different information sources based on the traffic information element knowledge base as generated by the apparatus 2 will be explained in detail with reference to FIGS. 10-15.

Figure 10:
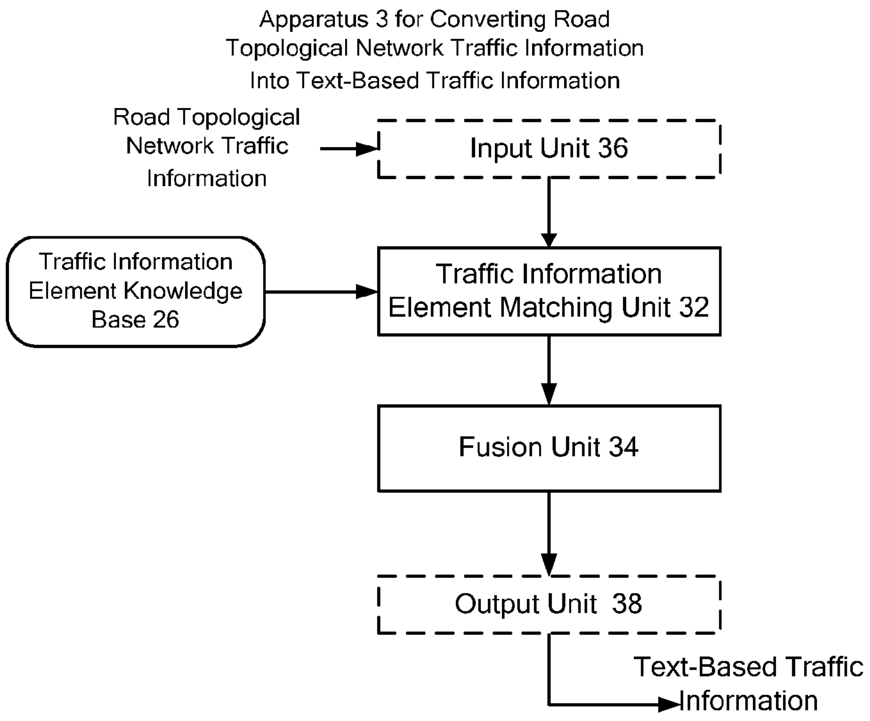
FIG. 10 is a schematic block diagram showing the structure of the apparatus for converting road topological network-based traffic information into text description-based traffic information according to the present invention.

FIG. 10 is a schematic block diagram showing the structure of the apparatus 3 for converting road topological network-based traffic information into text description-based traffic information according to the present invention. The apparatus 3 comprises: a traffic information element matching unit 32 for retrieving, in a traffic information element knowledge base 26, names which are matched with names of respective paths in the road topological network traffic information, and obtaining traffic information elements corresponding to the matched names; and a fusion unit 34 for fusing the traffic information of the respective paths based on correspondence between the obtained traffic information elements and the respective paths, to generate text description-based traffic information for the obtained traffic information elements. The apparatus 3 can further comprise an input unit 36 for inputting the traffic information based on road topological network and an output unit 38 for outputting the generated textual description.

The road topological network traffic information can include a travel speed and/or travel time and/or congestion level for each path probed based on an digital navigation map. The text description-based traffic information can include a textual description of the traffic condition for the traffic information elements including roads, sections and intersections.

Figure 12:
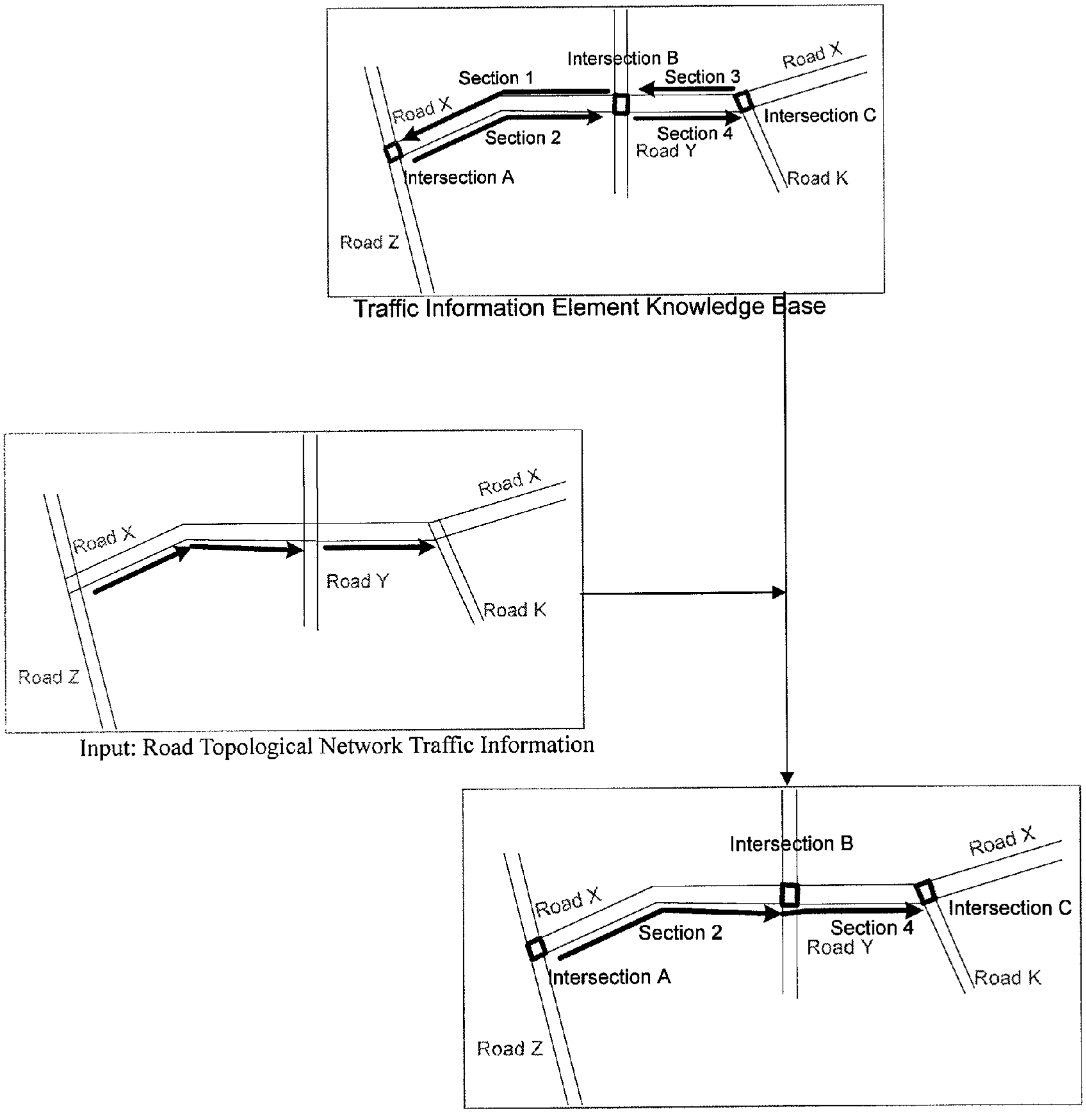
FIG. 12 shows an illustrative process for converting road topological network-based traffic information into text description-based traffic information.

Reference is now made to FIG. 12, which shows an illustrative process for converting road topological network traffic information into text description-based traffic information. For example, the input unit 36 inputs road topological network traffic information probed by means of probe vehicles, such as "Road X, path 1, west-to-east, 10 km/h", "Road X, path 2, west-to-east, 15 km/h", etc. The traffic information element matching unit 32 retrieves from the traffic information element knowledge base 26 the names matched with the path name in the traffic information, Road X, to obtain the associated traffic information elements, Road X, Section 2, Section 4 and Intersections A, B and C. The fusion unit 34 fuses the traffic information for the paths (paths 1, 2, . . . ) based on the correspondence between the obtained traffic information elements and the respective paths. In this case, from an average speed of only 12 km/h, it is possible to infer that Road X is congested in the direction from west to east. Accordingly, the fusion unit 34 generates the text description-based traffic information as follows:

Road X, From A to C, Congested;

Section 2 Congested;

Section 4 Congested; and

Intersection B, West-to-East, Congested.

The above information is then output from the output unit 38. As such, the conversion from the road topological network-based traffic information into the text description-based traffic information is completed.

Figure 11:
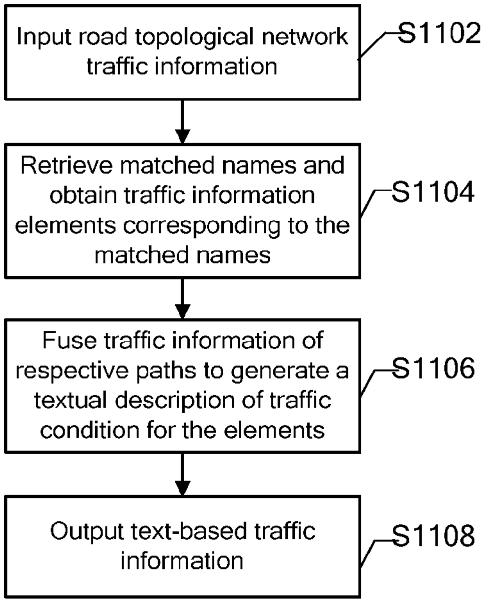
FIG. 11 is a flowchart illustrating the method for converting road topological network-based traffic information into text description-based traffic information according to the present invention.

FIG. 11 is a flowchart illustrating the method for converting road topological network-based traffic information into text description-based traffic information according to the present invention. At step 1102, the input unit 36 inputs the traffic information based on road topological network. At step 1104, the traffic information element matching unit 32 retrieves, from a traffic information element knowledge base 26, names matched with the names of respective paths in the road topological network traffic information and obtains traffic information elements corresponding to the matched names. At step 1106, the fusion unit 34 fuses the traffic information of the respective paths based on correspondence between the obtained traffic information elements and the respective paths, to generate text-based traffic information for the obtained traffic information elements. Finally at step 1108, the output unit 38 outputs the generated textual description.

Figure 13:
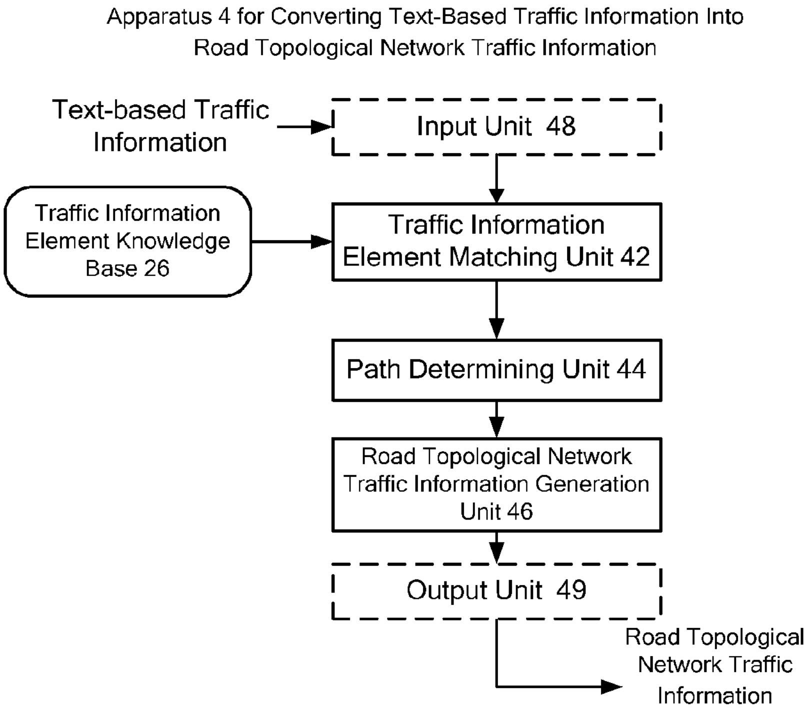
FIG. 13 is a schematic block diagram showing the structure of the apparatus for converting text description-based traffic information into road topological network-based traffic information according to the present invention.

FIG. 13 is a schematic block diagram showing the structure of the apparatus 4 for converting text description-based traffic information into road topological network-based traffic information according to the present invention. The apparatus 4 comprises a traffic information element matching unit 42 for retrieving, in a traffic information element knowledge base 26, names which are matched with names of roads and/or intersections in the text description-based traffic information, and obtaining traffic information elements corresponding to the matched names; a path determining unit 44 for determining paths corresponding to the obtained traffic information elements; and a road topological network-based traffic information generating unit 46 for obtaining traffic information for the determined paths and generating the road topological network traffic information for the determined paths. The apparatus 4 can further comprise an input unit 48 for inputting the text description-based traffic information and an output unit 49 for outputting the generated road topological network-based traffic information.

Figure 15:
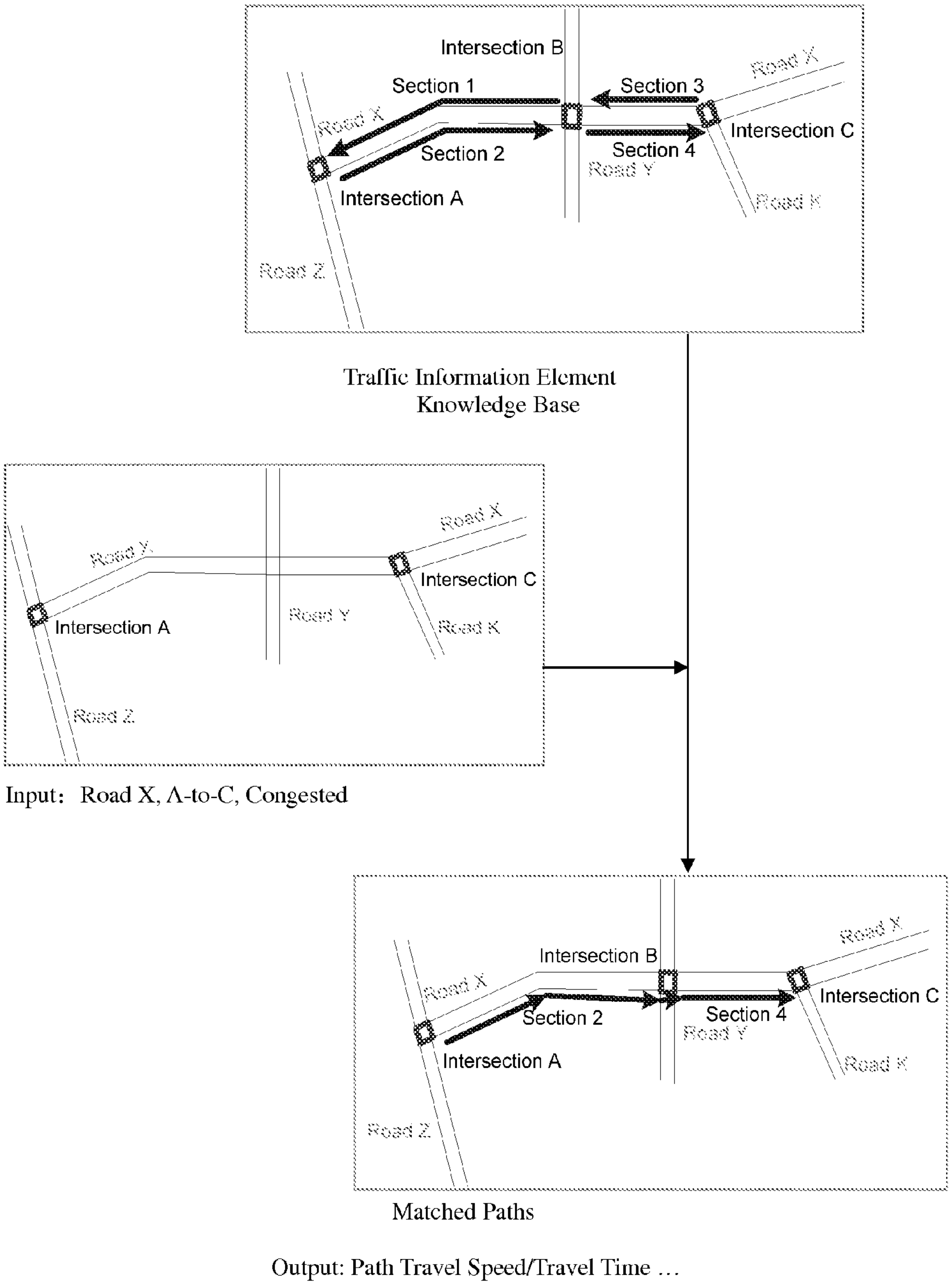
FIG. 15 shows an illustrative process for converting text description-based traffic information into road topological network-based traffic information.

Reference is now made to FIG. 15, which shows an illustrative process for converting text description-based traffic information into road topological network-based traffic information. As an example, the input unit 48 inputs text description-based traffic information, "Intersection A to Intersection C on Road X is congested". The traffic information element matching unit 42 retrieves from the traffic information element knowledge base 26 the names matched with the road name, "Road X", and/or the intersection names, "Intersection A" and "Intersection C", and obtains the traffic information elements corresponding to the matched names: Road X, Section 2, Section 4 and Intersections A, B, C. The path determining unit 44 determines the paths corresponding to the obtained traffic information elements as Road X, paths 1, 2, . . . , based on the traffic information to element knowledge base 26. The road topological network-based traffic information generating unit 46 obtains from probing devices (such as probe vehicles) the traffic information for the determined "Road X, paths 1, 2, . . . " and generates the road topological network traffic information for the determined paths. For example, the travel speed for "Road X, paths 1, 2, . . . " can be obtained from probe vehicles, as the road topological network-based traffic information. Then, the output unit 48 outputs the generated traffic information. As such, the conversion from the text description-based traffic information into the road topological network-based traffic information is completed.

Figure 14:
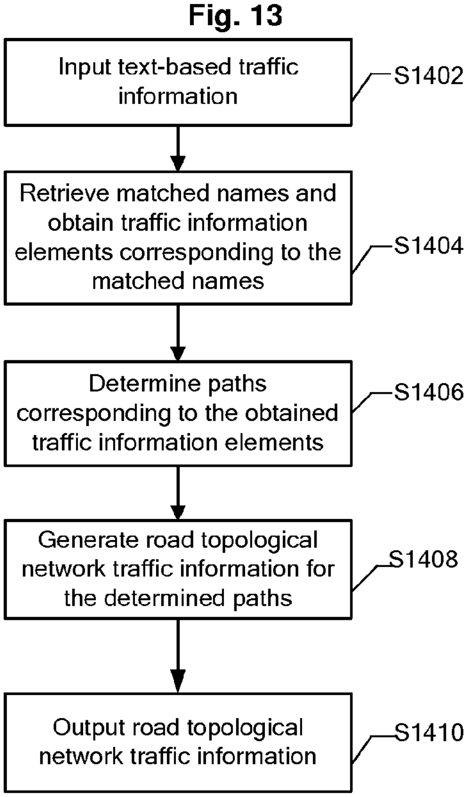
FIG. 14 is a flowchart illustrating the method for converting text description-based traffic information into road topological network-based traffic information according to the present invention.

FIG. 14 is a flowchart illustrating the method for converting text description-based traffic information into road topological network-based traffic information according to the present invention. At step 1402, the input unit 48 inputs the traffic information based on textual description. At step 1404, the traffic information element matching unit 42 retrieves, from the traffic information element knowledge base 26, names which are matched with the names of roads and/or intersections in the text description-based traffic information, and obtains traffic information elements corresponding to the matched names. At step 1406, the path determining unit 44 for determining paths corresponding to the obtained traffic information elements. At step 1408, the road topological network-based traffic information generating unit 46 obtains the traffic information for the determined paths and generates the road topological network-based traffic information for the determined paths. Finally at step 1410, the output unit 49 outputs the generated road topological network-based traffic information.

In the above description, detailed explanation of known technologies and functions are omitted, so as not to obscure the basic concept of the present invention. For example, the specific process for matching can be achieved by any matching approach in the prior art.

It should be noted that the foregoing illustrates the solutions of the present invention by way of example only and is not intended to limit the present invention to the steps and element structures as described above. It is possible to adjust and modify such steps and element structures as desired. Thus, some of the steps and elements are not essential for implementing the general concept of the present invention. Accordingly, the essential technical features of the present invention are limited by only the minimum requirements for implementing the general concept of the present invention, rather than the above particular embodiments.

To this end, the present invention has been disclosed with reference to the preferred embodiments thereof. It can be appreciated that any other modifications, alternatives and additions can be made by those who skilled in the art without departing from the spirits and scope of the present invention. Therefore, the scope of the present invention is not limited to the above particular embodiments, but only limited by the claims as attached.

What is claimed is:

1. A method for establishing a traffic information describing model, comprising:

an extraction step of extracting predefined traffic information elements and attributes corresponding to the traffic information elements from a road topological network, based on basic constituent elements of the road topological network;

a relationship determining step of determining, by a processor, the relationship between the extracted traffic information elements, based on the extracted traffic information elements, the attributes, and correspondence between the traffic information elements and the basic constituent elements of the road topological network; and a describing model establishment step of establishing a traffic information describing model corresponding to the road topological network with the extracted traffic information elements and the attributes and the determined relationship between the traffic information elements.

2. The method of claim 1, wherein the basic constituent elements of the road topological network comprise paths and nodes formed by intersection of the paths, and wherein the predefined traffic information elements comprise roads, intersections and sections.

3. The method of claim 2, wherein the extraction step further comprises:

a road name acquisition step of acquiring all the road names in the road topological network by traversing all of the paths each having a road name in the road topological network and incorporating duplicate names;

a single-direction road extraction step of detecting, for each of the acquired road names from the road topological network a sequence of consecutive paths passing along each of the travel directions of the road having the road name, as a single-direction road extracted along the travel direction, and naming the extracted single-direction road and unnamed paths belonging to the extracted single-direction road with the road name, to obtain the name attributes of the single-direction road;

an intersection extraction step of sequentially detecting, for each of the acquired road names, nodes at which each path in the sequence of paths having the road name intersects with paths having different road names, and obtaining the geographical areas at which the nodes are located as intersections, to extract all intersections on a single-direction road having the road name, and naming the extracted intersections to obtain the name attributes of the intersections; and a section extraction step of acquiring, for each of the acquired road names, a road segment between every two neighboring intersections as a section, based on all of the extracted intersections on the single-direction road having the road name, to extract all sections on the single-direction road having the road name, and naming the extracted sections to obtain the name attributes of the sections.

4. The method of claim 3, wherein in the intersection extraction step, two or more extracted intersections are incorporated together if they are located in a same geographical location.

5. The method of claim 3, wherein in the relationship determining step, determines the relationship between the traffic information elements by (i) determining an entrance road, an exit road and a turn direction for each intersection, (ii) a start and end intersection for each section, and (iii) determining all intersections and sections included in each single-direction road.

6. The method of claim 5, wherein in the describing model establishment step, the traffic information describing model corresponding to the road topological network is established with the extracted single-direction roads, sections and intersections and respective name attributes that correspond to the single-direction roads, sections and intersections, the determined relationship, and the correspondence between the extracted single-direction roads, sections and intersections and the paths and nodes.

7. The method of claim 3, further comprising: a traffic information element name editing step of editing, if the obtained name of the traffic information element is incorrect or incompliant with a name used in people's daily life, the name of the traffic information element to obtain the name attribute which is correct and compliant with the name used in people's daily life.

8. The method of claim 1, further comprising a knowledge base generation step of generating a traffic information element knowledge base by using the established traffic information describing model.

9. A method for converting between road topological network-based traffic information and text description-based traffic information, when converting road topological network-based traffic information into text description based traffic information, the method comprises:

a traffic information element matching step of retrieving, in a traffic information element knowledge base, names matched with names of respective paths in the road topological network-based traffic information, and obtaining traffic information elements corresponding to the matched names; and a fusion step of fusing, by a processor the traffic information of the respective paths based on correspondence between the obtained traffic information elements and the respective paths, to generate text description-based traffic information for the obtained traffic information elements; when converting text description-based traffic information into road topological network-based traffic information, the method comprises:

a traffic information element matching step of retrieving, in a traffic information element knowledge base, names matched with names of roads or intersections in the text description-based traffic information, and obtaining traffic information elements corresponding to the matched names; and a path determining step of determining paths corresponding to the obtained traffic information elements; and a road topological network-based traffic information generating step of obtaining traffic information for the determined paths and generating the road topological network-based traffic information for the determined paths;

wherein the traffic information element knowledge base is generated by using a traffic information describing model.

10. The method of claim 9, wherein the road topological network-based traffic information comprises travel speed or travel time or congestion indication for each path extracted by the extraction operation, and wherein the text description-based traffic information comprises text description of traffic conditions of the traffic information elements including roads, sections and intersections.

11. An apparatus for establishing a traffic information describing model, comprising:

an extraction unit for extracting predefined traffic information elements and attributes corresponding to the traffic information elements from a road topological network, based on basic constituent elements of the road topological network;

a relationship determining unit, implemented by a processor, for determining the relationship between the traffic information elements, based on the extracted traffic information elements, the attributes, and correspondence between the traffic information elements and the basic constituent elements of the road topological network; and a describing model establishment unit for establishing the traffic information describing model corresponding to the road topological network with the extracted traffic information elements and the attributes and the determined relationship between the traffic information elements.

12. The apparatus of claim 11, wherein the basic constituent elements of the road topological network comprise paths and nodes formed by intersection of the paths, and wherein the predefined traffic information elements comprise roads, intersections and sections.

13. The apparatus of claim 12, wherein the extraction unit further comprises:

a road name acquisition unit for acquiring all the road names on the road topological network by traversing all of the paths each having a road name in the road topological network and incorporating duplicate names;

a single-direction road extraction unit for detecting, for each of the acquired road names, from the road topological network a sequence of consecutive paths passing along each of the travel directions of the road having the road name, as a single-direction road extracted along the travel direction, and naming the extracted single-direction road and unnamed paths belonging to the extracted single-direction road with the road name, to obtain the name attributes of the single-direction road;

an intersection extraction unit for sequentially detecting, for each of the acquired road names, nodes at which each path in the sequence of paths having the road name intersects with paths having different road names, and obtaining the geographical areas at which the nodes are located as intersections, to extract all intersections on a single-direction road having the road name, and naming the extracted intersections to obtain the name attributes of the intersections;

and a section extraction unit for acquiring, for each of the acquired road names, a road segment between every two neighboring intersections as a section, based on all of the extracted intersections on the single-direction road having the road name, to extract all sections on the single-direction road having the road name, and naming the extracted sections to obtain the name attributes of the sections.

14. The apparatus of claim 13, wherein the intersection extraction unit is configured to incorporate two or more extracted intersections together if they are located in a same geographical location.

15. The apparatus of claim 13, wherein the relationship determining unit determines the relationship between the traffic information elements by determining an entrance road, an exit road and a turn direction for each of turns at each intersection, determining a start intersection and an end intersection for each section, and determining all intersections and sections included in each single-direction road.

16. The apparatus of claim 15, wherein the describing model establishment unit establishes the traffic information describing model corresponding to the road topological network with the extracted single-direction roads, sections and intersections and respective name attributes, the determined relationship, and the correspondence between the extracted single-direction roads, sections and intersections and the paths and nodes.

17. The apparatus of claim 13, further comprising: a traffic information element name editing unit for editing, if the obtained name of the traffic information element is incorrect or incompliant with a name used in people's daily life, the name of the traffic information element to obtain the name attribute which is correct and compliant with the name used in people's daily life.

18. The apparatus of claim 13, further comprising a knowledge base generation unit for generating a traffic information element knowledge base by using the established traffic information describing model.

19. An apparatus for converting between road topological network-based traffic information and text description-based traffic information, comprising:

a section for converting road topological network-based traffic information into text description-based traffic information, comprising:

a traffic information element matching unit for retrieving, in a traffic information element knowledge base, names matched with names of respective paths in the road topological network based traffic information, and obtaining traffic information elements corresponding to the matched names; and a fusion unit, Implemented by a processor, for fusing the traffic information of the respective paths based on correspondence between the obtained traffic information elements and the respective paths, to generate text description-based traffic information for the obtained traffic information elements; and a section for converting text description-based traffic information into road topological network-based traffic information, comprising:

a traffic information element matching unit for retrieving, in a traffic information element knowledge base, names matched with names of roads or intersections in the text description-based traffic information, and obtaining traffic information elements corresponding to the matched names;

a path determining unit for determining paths corresponding to the obtained traffic information elements; and a road topological network traffic information generating unit for obtaining traffic information for the determined paths and generating the road topological network-based traffic information for the determined paths;

wherein the traffic information element knowledge base is generated by using a traffic information describing.

* * * * *